United States Patent
Kamata

(10) Patent No.: US 8,128,420 B2
(45) Date of Patent: Mar. 6, 2012

(54) ILLUMINATING DEVICE AND DISPLAY DEVICE

(75) Inventor: Daisuke Kamata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/997,028

(22) PCT Filed: Apr. 14, 2009

(86) PCT No.: PCT/JP2009/057499
§ 371 (c)(1),
(2), (4) Date: Dec. 9, 2010

(87) PCT Pub. No.: WO2010/004795
PCT Pub. Date: Jan. 14, 2010

(65) Prior Publication Data
US 2011/0086526 A1    Apr. 14, 2011

(30) Foreign Application Priority Data

Jul. 8, 2008  (JP) ................. 2008-178298

(51) Int. Cl.
*H01R 11/18* (2006.01)
(52) U.S. Cl. .................................................. 439/95
(58) Field of Classification Search ............ 439/95, 439/98, 108, 607.28, 607.44, 235, 239; 315/239; 362/217.14, 581, 631
See application file for complete search history.

(56) References Cited

U.S. PATENT DOCUMENTS

| | | | |
|---|---|---|---|
| 5,720,546 A * | 2/1998 | Correll et al. | 362/221 |
| 6,661,181 B2 | 12/2003 | Shin | |
| 7,030,546 B2 | 4/2006 | Han et al. | |
| 7,090,387 B2 * | 8/2006 | Kohno | 362/561 |
| 7,358,682 B2 * | 4/2008 | Matsushima | 315/239 |
| 7,926,965 B2 * | 4/2011 | Cho et al. | 362/97.1 |
| 7,950,823 B2 * | 5/2011 | Kwon et al. | 362/225 |
| 7,976,343 B2 * | 7/2011 | Gu et al. | 439/620.02 |
| 7,977,888 B2 * | 7/2011 | Jin | 315/177 |
| 2005/0127846 A1 * | 6/2005 | Kim | 315/169.4 |
| 2005/0226002 A1 * | 10/2005 | Aoki et al. | 362/581 |
| 2006/0208641 A1 | 9/2006 | Maniwa et al. | |
| 2006/0279957 A1 * | 12/2006 | Kwon et al. | 362/378 |
| 2007/0189041 A1 * | 8/2007 | Chen et al. | 362/631 |
| 2008/0079440 A1 * | 4/2008 | Lee et al. | 324/537 |
| 2009/0195188 A1 | 8/2009 | Maniwa et al. | |

FOREIGN PATENT DOCUMENTS

| | | |
|---|---|---|
| JP | 2008-016335 A | 1/2008 |
| JP | 2008-135226 A | 6/2008 |

OTHER PUBLICATIONS

Official Communication issued in International Patent Application No. PCT/JP2009/057499, mailed on Jul. 21, 2009.

* cited by examiner

*Primary Examiner* — Alexander Gilman
(74) *Attorney, Agent, or Firm* — Keating & Bennett, LLP

(57) ABSTRACT

An illuminating device is provided with a cold cathode fluorescent tube (discharge tube) (20), an inverter circuit (T) that is connected to the cold cathode fluorescent tube (20) and drives the cold cathode fluorescent tube (20) to be turned on, a chassis (12) made from metal for accommodating the cold cathode fluorescent tube (20), an inverter circuit board (24) on which the inverter circuit (T) is mounted and in which a ground wire (G) is provided, and a connector (21) for electrically connecting the cold cathode fluorescent tube (20) and the inverter circuit (T). The connector (21) is provided with a conductor (23) for electrically connecting the chassis (12) and the ground wire (G).

4 Claims, 5 Drawing Sheets

ILLUMINATING DEVICE AND DISPLAY DEVICE

TECHNICAL FIELD

The present invention relates to an illuminating device, particularly an illuminating devices using a discharge tube such as cold cathode fluorescent tube, and to a display device using the same.

BACKGROUND ART

Recently, display devices that include a liquid crystal panel serving as a flat display unit having many features such as the reduced thickness and weight compared with a conventional cathode-ray tube (CRT), as typified by a liquid crystal display device, have become the mainstream of domestic television receivers, for example. Such a liquid crystal display device includes an illuminating device for emitting light (back light) and a liquid crystal panel that displays desired images by functioning as a shutter against the light from a light source provided in the illuminating device. In such a television receiver, information such a characters and images contained in television broadcasting video signals is displayed on the display screen of the liquid crystal panel.

Illuminating devices are broadly classified into direct type and edge light type, depending on the arrangement of the light source relative to the liquid crystal panel. Direct type illuminating devices, with which high brightness and large screen size are easier to achieve than with the edge light type, are normally employed for liquid crystal display devices including a liquid crystal panel of 20 inches or larger. Specifically, since the direct type illuminating device is configured by arranging a plurality of light sources on the rear side (non-display screen side) of the liquid crystal panel, the light sources can be arranged just behind the liquid crystal panel, and therefore it is possible to use a large number of light sources, thereby readily achieving high brightness. Therefore, the direct type illuminating device is suitable for achieving high brightness and large screen size. In addition, the inside of the direct type illuminating device is a hollow structure, so the weight of even a large size device can be suppressed. This is another reason why the direct type illuminating device is suitable for achieving high brightness and large screen size.

With the conventional direct type illuminating device as described above, as disclosed in JP 2002-231034A for example, it is proposed to provide a plurality of cold cathode fluorescent tubes as light sources, to connect an inverter circuit to each of the cold cathode fluorescent tubes, and to drive the cold cathode fluorescent tubes through high-frequency lighting by the inverter circuit.

DISCLOSURE OF INVENTION

Problem to be Solved by the Invention

In the conventional illuminating device as described above, a transformer provided in the inverter circuit and a control IC that drives a switching element such as a field effect transistor (FET) for driving the transformer are generally mounted on an inverter circuit board. And in the conventional illuminating device, for example, electrical continuity is established from a ground wire provided on the inverter circuit board to the chassis through a screw for attaching the inverter circuit board to the chassis, thereby grounding the inverter circuit.

However, with the conventional illuminating device as described above, there is a case in which defective grounding occurs and causes noise, and such noise is input to the control IC of the inverter circuit or the like, causing an adverse effect such as malfunction. Specifically, in the conventional illuminating device, due to variance in accuracy or torque in attaching the screw to the ground wire, or as a result of the screw having loosened after a long period of use, appropriate electrical connection between the screw and the ground wire may cease to be achieved, which brings about defective grounding and causes an adverse effect of noise in the inverter circuit. In particular, in the conventional illuminating device, as a result of reducing the size of the inverter circuit board, the distance between the ground wire and the transformer or the control IC is shortened, and an adverse effect of noise readily occurs in the inverter circuit due to the defective grounding described above. Also, as the size of the circuit board is reduced, the physical locations of the portion in the circuit for driving the cold cathode fluorescent tube (lamp) at a high-voltage high-frequency and the low-voltage circuit portion become close to each other, and the adverse effect of noise caused in the low-voltage circuit portion through the ground wire becomes a problem in many cases.

In view of the above, the present invention provides an illuminating device that can prevent an adverse effect of noise from occurring in the inverter circuit even with the reduced size of the inverter circuit board, and a display device using the same.

Means for Solving Problem

In order to achieve the above object, the present invention provides an illuminating device that includes a discharge tube; an inverter circuit that is connected to the discharge tube and drives the discharge tube to be turned on; a chassis made from metal that accommodates the discharge tube; an inverter circuit board on which the inverter circuit is mounted and in which a ground wire is provided; and a connector for electrically connecting the discharge tube and the inverter circuit, wherein a conductor for electrically connecting the chassis and the ground wire is provided in the connector.

The illuminating device as described above includes a connector for electrically connecting the discharge tube and the inverter circuit, and the connector is provided with a conductor for electrically connecting the chassis and the ground wire provided in the inverter circuit board. Therefore, unlike the above conventional examples, even when the size of the inverter circuit board is reduced, an adverse effect of noise in the inverter circuit can be prevented.

Also in the illuminating device, it is preferable that the conductor is attached to an outer surface of the connector.

In this case, the structure of the connecter can be prevented from becoming complicated and also grounding (operation for grounding) of the inverter circuit can be easily performed by electrically connecting the chassis and the ground wire.

Also, in the illuminating device, it is preferable that the inverter circuit board is attached to the chassis, the chassis has an attachment hole for inserting the connector through and attaching the connector to the chassis, and the conductor is electrically connected to the chassis and the ground wire provided in the inverter circuit board, when the connector is inserted into the attachment hole.

In this case, when the connector is attached to the attachment hole of the chassis, the chassis and the ground wire are electrically connected by the conductor at the same time, and the grounding (operation for grounding) of the inverter circuit can be performed more easily.

Also, a display device of the present invention uses any of the above-described illuminating devices.

With the display device configured as described above, the illuminating device used is capable of preventing occurrence of an adverse effect of noise in the inverter circuit even when the size of the inverter circuit board is reduced. Thus, it is possible to easily configure a display device that is compact and reliable.

Effects of the Invention

According to the present invention, it is possible to provide an illuminating device capable of preventing occurrence of an adverse effect of noise in the inverter circuit even when the size of the inverter circuit board is reduced, and a display device using the same.

DESCRIPTION OF THE INVENTION

A preferred embodiment of the illuminating device of the present invention and the display device using the same will be described below with reference to the attached drawings. Note that in the following description, a case in which the present invention is applied to a transmissive liquid crystal display device is described as an example. The dimensions of the constituent members in figures do not faithfully represent the actual dimensions of the constituent members or dimensional ratios of the constituent members.

Figure 1:
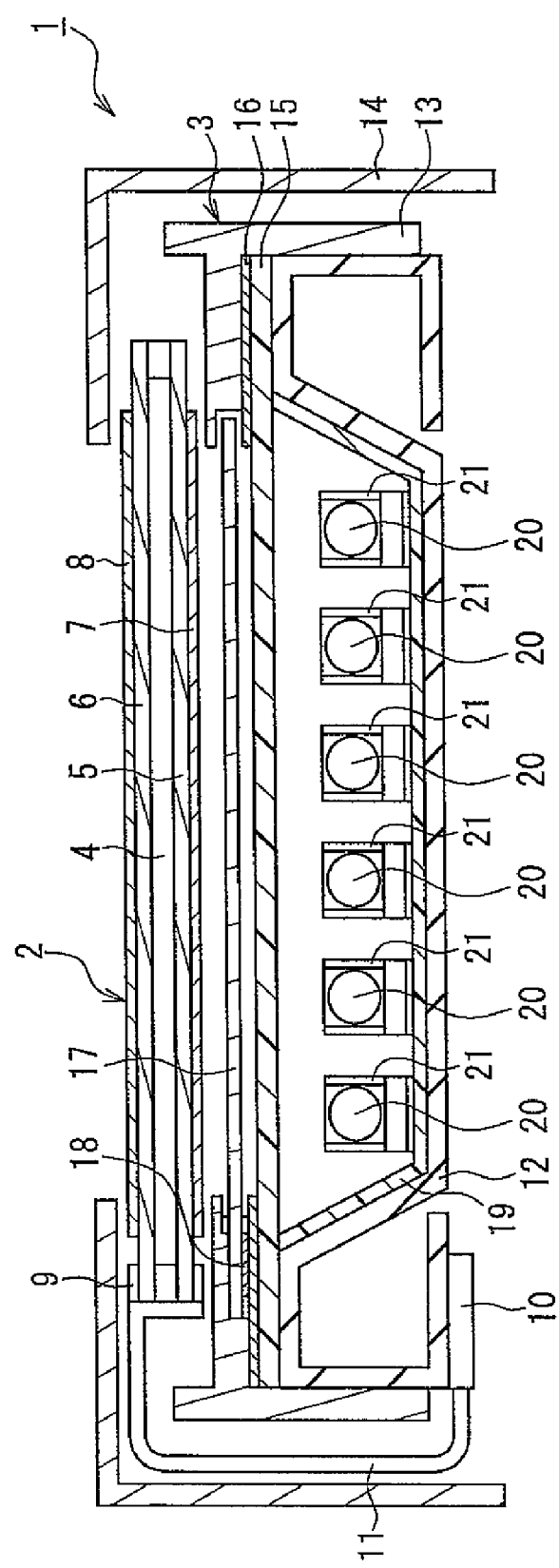
FIG. 1 is a schematic cross-sectional view illustrating an illuminating device and a liquid crystal display device according to an embodiment of the present invention.

FIG. 1 is a schematic cross-sectional view illustrating an illuminating device and a liquid crystal display device according to an embodiment of the present invention. In FIG. 1, a liquid crystal display device 1 of the present embodiment includes a liquid crystal panel 2 as a display unit, the upper side of which in FIG. 1 is arranged as the viewing side (display screen side), and an illuminating device 3 of the present invention that is arranged on the non-display screen side of the liquid crystal panel 2 (lower side in FIG. 1), and emits illumination light for illuminating the liquid crystal panel 2.

The liquid crystal panel 2 includes a liquid crystal layer 4, a pair of transparent substrates 5 and 6 that sandwich the liquid crystal layer 4 therebetween, and polarizing plates 7 and 8 respectively provided on the outer surface of the transparent substrates 5 and 6. The liquid crystal panel 2 includes a driver 9 for driving the liquid crystal panel 2, and a driving circuit 10 connected to the driver 9 via a flexible printed board 11. The liquid crystal panel 2 is configured to be able to drive the liquid crystal layer 4 per pixel. In the liquid crystal panel 2, desired images are displayed by modulating the polarizing state of the illumination light that enters through the polarizing plate 7 by the liquid crystal layer 4, and by controlling the light amount that passes through the polarizing plate 8 by the liquid crystal layer 4.

The illuminating device 3 includes a chassis 12 with a bottom, the upper side (liquid crystal panel 2 side) thereof in FIG. 1 being open, and a frame-shaped frame 13 provided on the liquid crystal panel 2 side of the chassis 12. The chassis 12 constitutes a housing accommodating a cold cathode fluorescent tube (discharge tube) described later, and the inverter circuit to be described later is grounded (to be described later in detail). The chassis 12 and frame 13 are formed by metal, for example, and are held by a bezel 14 having an L-shaped cross section, with the liquid crystal panel 2 being provided above the frame 13. The illuminating device 3 is thus assembled to the liquid crystal panel 2 and integrated as a transmissive liquid crystal display device 1 in which illumination light from the illuminating device 3 enters the liquid crystal panel 2.

Also, the illuminating device 3 includes a diffuser panel 15 provided so as to cover the opening of the chassis 12, an optical sheet 17 provided on the liquid crystal panel 2 side above the diffuser panel 15, and a reflection sheet 19 provided on the inner surface of the chassis 12. In the illuminating device 3, a plurality of (for example, six) cold cathode fluorescent tubes 20 as the discharge tube are aligned in parallel to each other above the reflection sheet 19. These cold cathode fluorescent tubes 20 are aligned evenly spaced at regular intervals (pitch) in a direction that perpendicularly intersects the lengthwise direction of the cold cathode fluorescent tubes 20 (horizontal direction in FIG. 1), and light from the cold cathode fluorescent tubes 20 is emitted from the light-emitting surface of the illuminating device 3 that is opposed to the liquid crystal panel 2 as the illumination light.

Also, each cold cathode fluorescent tube 20 has electrode portions provided at both ends thereof electrically connected to a connecter 21. As described below, the cold cathode fluorescent tube 20 is drawn to the outside of the chassis 12 via the connecter 21. In the illuminating device 3, the cold cathode fluorescent tubes 20 are connected to the CCFL driving circuit (inverter circuit) to be described below, and are driven to be turned on by Pulse Width Modulation (PWM) dimming, for example.

Now, the configuration of the main portion of the illuminating device 3 according to the present embodiment is specifically described with reference to FIG. 2 and FIG. 3.

Figure 2:
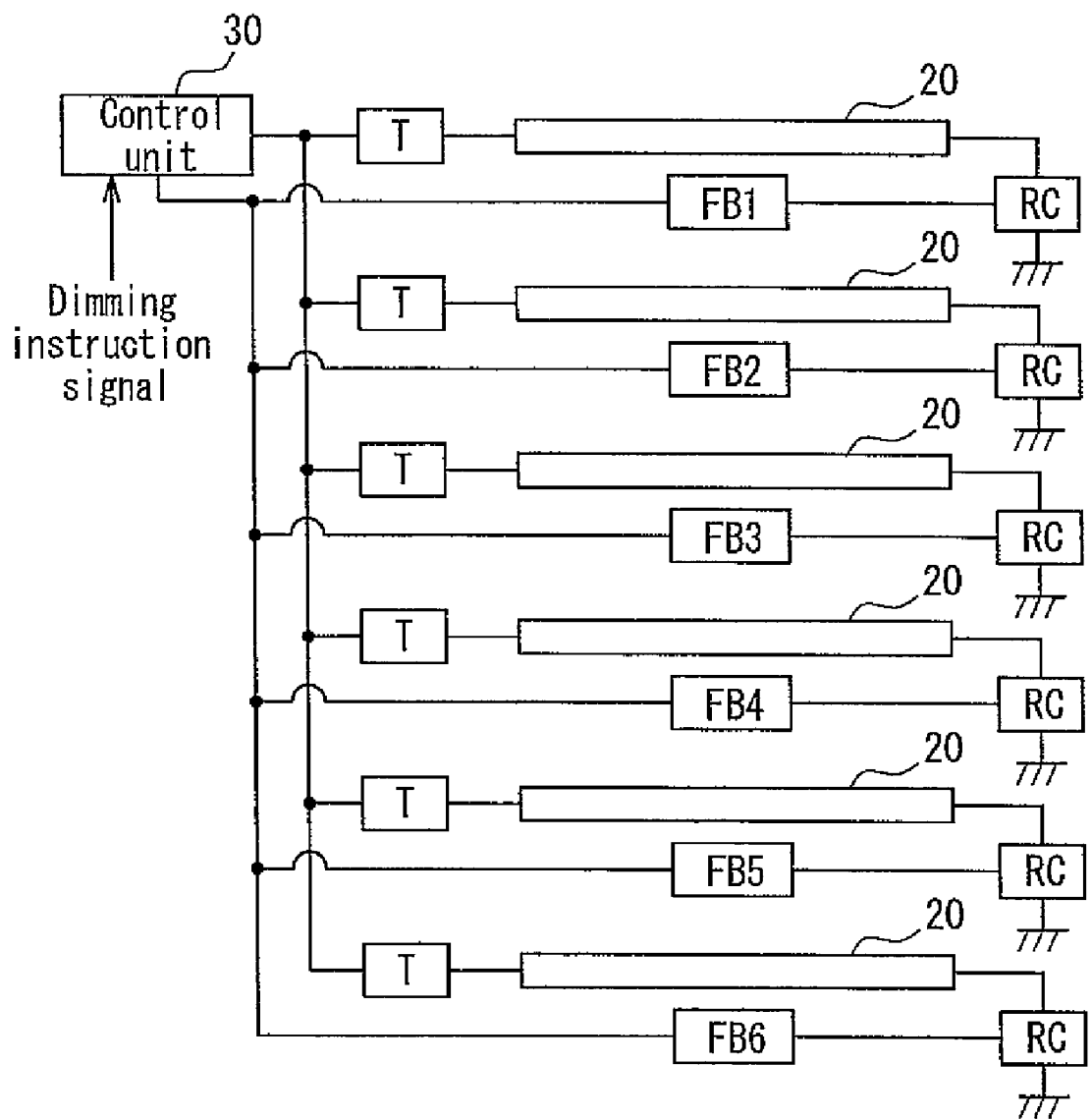
FIG. 2 illustrates the configuration of the main portion of the illuminating device.
Figure 3:
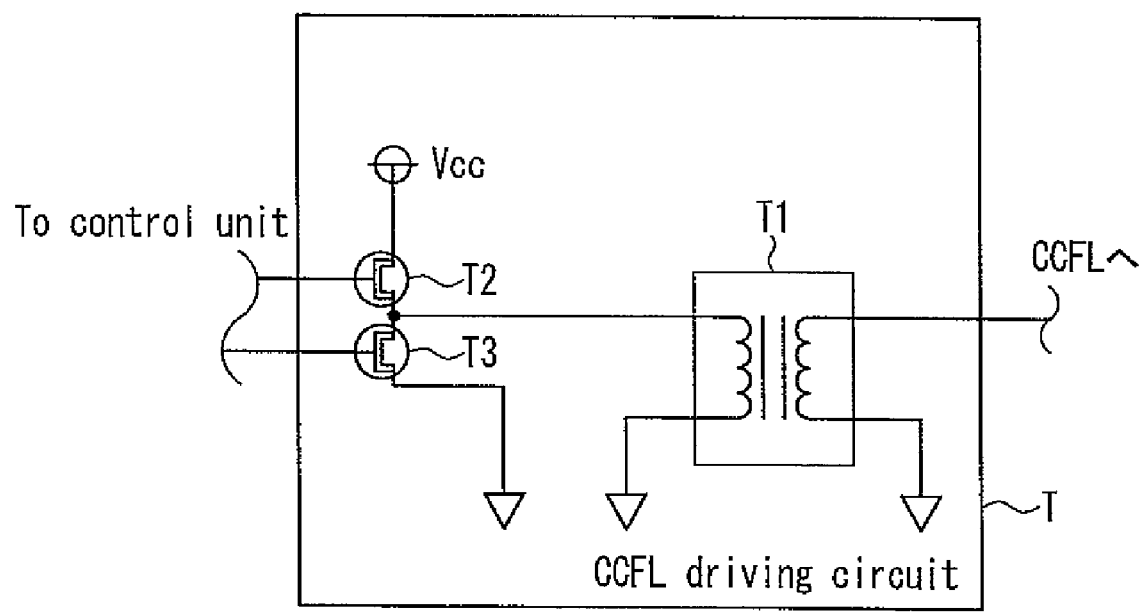
FIG. 3 is a configuration example of a CCFL driving circuit shown in FIG. 2.

FIG. 2 illustrates the configuration of the main portion of the illuminating device, and FIG. 3 illustrates a configuration example of the CCFL driving circuit shown in FIG. 2.

As shown in FIG. 2, the illuminating device 3 includes a control unit 30 that controls driving each of a plurality of cold cathode fluorescent tubes 20, and a CCFL driving circuit T that is provided in each of the cold cathode fluorescent tubes 20, and drives the corresponding cold cathode fluorescent tube 20 to be turned on based on a drive signal from the control unit 30. This CCFL driving circuit T is provided on one end side of the cold cathode fluorescent tube 20 in the lengthwise direction thereof, and is configured to supply current to the corresponding cold cathode fluorescent tube 20 from that one end side. The CCFL driving circuit T employs the inverter circuit described below. The CCFL driving circuit T is configured to be able to drive the corresponding cold cathode fluorescent tube 20 using PWM dimming based on the drive signal.

Further, the illuminating device 3 includes lamp current detection circuits RC that are provided for the respective cold cathode fluorescent tubes 20 and detect a lamp current value flowing through the corresponding cold cathode fluorescent tubes 20. The illuminating device 3 is configured such that the lamp current values detected by the lamp current detection circuits RC are output to the control unit 30 via feedback circuits FB1, FB2, FB3, FB4, FB5 and FB6 respectively provided for the cold cathode fluorescent tubes 20.

Further, the control unit 30 receives, as an instruction signal from an external source, input of a dimming instruction signal for changing the brightness at the light-emitting surface of the illuminating device 3, for example. Therefore the liquid crystal display device 1 is configured such that the user can appropriately change the brightness at the display screen of the liquid crystal panel 2. That is, the control unit 30 receives input of the dimming instruction signal from an operation input device such as a remote controller (not shown) provided on the liquid crystal display device 1 side, for example. The control unit 30 uses the input dimming instruction signal to determine the duty ratio under PWM dimming, and also set a target value of current supply to each of the cold cathode fluorescent tubes 20.

Thereafter, the control unit 30 generates a drive signal to each CCFL driving circuit T based on the determined target value and outputs the drive signal, so that the value of lamp current flowing through the corresponding cold cathode fluorescent tube 20 is varied. As a result, the amount of the light emitted from each of the cold cathode fluorescent tubes 20 varies in accordance with the dimming instruction signal, and the brightness at the light-emitting surface of the illuminating device 3 and the brightness at the display screen of the liquid crystal panel 2 are appropriately varied in response to operation instructions from the user.

The lamp current value actually supplied to each of the cold cathode fluorescent tubes 20 is fed back to the control unit 30 as a detection current value through the corresponding lamp current detection circuits RC and the corresponding feed back circuits FB1 to FB6. Then, the control unit 30 performs feedback control with the use of the detection current value and the target value of current supply determined based on the dimming instruction signal, thereby maintaining display at the brightness desired by the user.

As shown in FIG. 3, the CCFL driving circuit T employs an inverter circuit including a transformer T1, and transistors T2 and T3 connected to the control unit 30 and provided on the primary winding side of the transformer T1, and a power supply VCC connected to the transistor T2, and the CCFL driving circuit T causes the cold cathode fluorescent tubes 20 connected thereto to undergo high-frequency lighting. That is, to the secondary winding of the transformer T1 is connected a high-voltage side terminal of any of the cold cathode fluorescent tubes 20, and as a result of the transistors T2 and T3 performing switching operation based on the drive signal from the control unit 30, the transformer T1 supplies electric power to the corresponding cold cathode fluorescent tube 20 from the power supply VCC to drive that cold cathode fluorescent tube 20 to be turned on.

Further, in the CCFL driving circuit T, the transistors T2 and T3 are each formed by a field-effect transistor (FET) for example, and are mounted on the inverter circuit board described later with the transformer T1.

Next, the connecter 21 and the inverter circuit board according to the present embodiment will be described specifically with reference to FIG. 4 and FIG. 5.

Figure 4A:
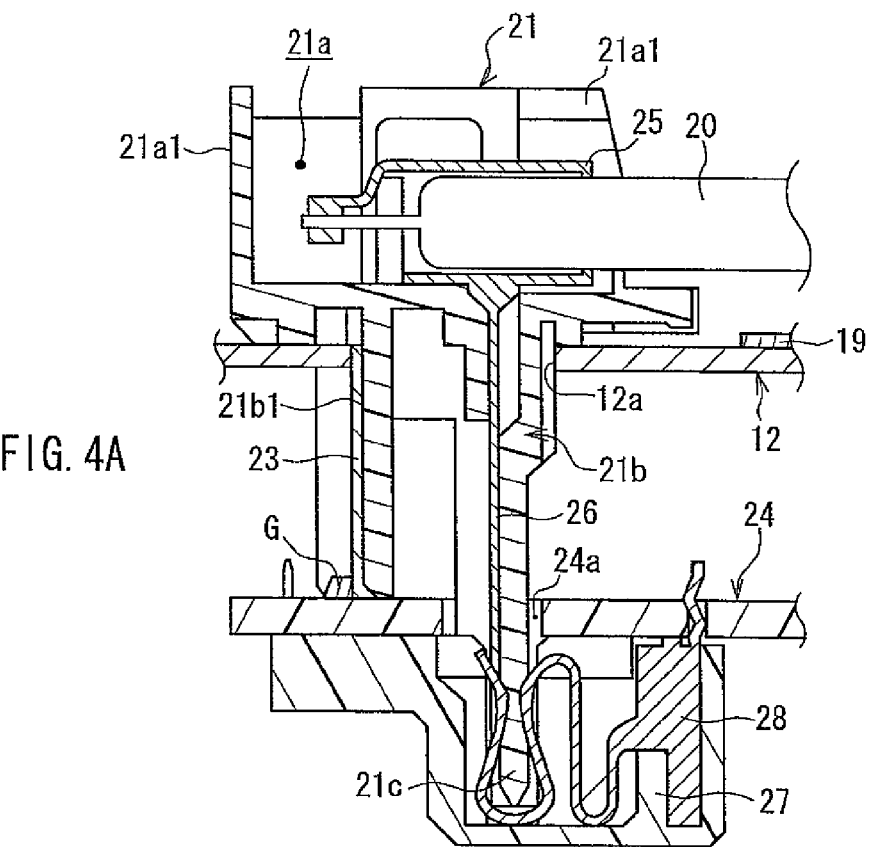
FIG. 4(a) is a cross-sectional view of the vicinity of the connector shown in FIG. 1.
Figure 4B:
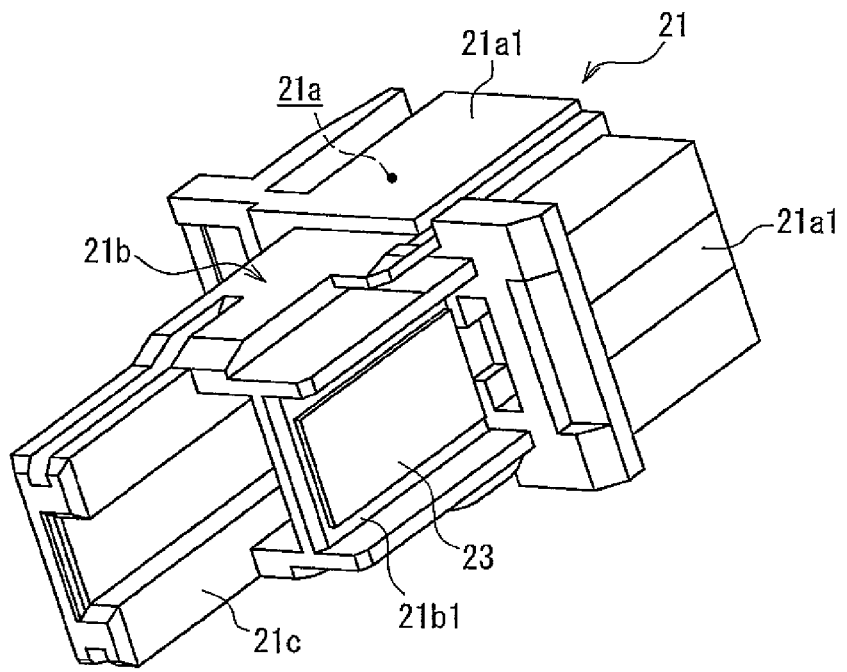
FIG. 4(b) is a perspective view of the connector.

FIG. 4(a) is a cross-sectional view of the vicinity of the connector shown in FIG. 1, and FIG. 4(b) is a perspective view of the connector. FIG. 5 is a plan view illustrating the inverter circuit board shown in FIG. 4(a).

As shown in FIG. 4(a) and FIG. 4(b), the connecter 21 includes an attachment unit 21a provided in an upper portion in FIG. 4(a) and to which the cold cathode fluorescent tube 20 is attached, an extension unit 21b extending downward from the attachment unit 21a and attached to the chassis 12, and a protruding unit 21c formed to protrude downward from one end portion of the extension unit 21b (right end portion in FIG. 4(a)) and fixed to an inverter circuit board 24.

The attachment unit 21a has a space surrounded by three walls 21a1 that are provided so as to respectively oppose an end and the right and left sides of the cold cathode fluorescent tube 20. Inside that space is provided a substantially cylindrical connecting member 25 that is electrically connected to the electrode portion of the cold cathode fluorescent tubes 20.

Also, the connecter 21 is configured such that the extension unit 21b engages an attachment hole 12a provided in the chassis 12 as a result of sequentially inserting the protruding unit 21c and extension unit 21b into the attachment hole 12a, thereby the connecter 21 is attached to the chassis 12. Further, in the connecter 21, the protruding unit 21c engages an attachment hole 24a provided in the inverter circuit board 24, as a result of inserting the protruding unit 21c into the attachment hole 24a, and the connecter 21 is thereby attached to the inverter circuit board 24.

Also, a conducting member 26 that is electrically connected to a connecting member 25 is provided in the extension unit 21b of the connecter 21. The leading end portion of the conducting member 26 extends to the protruding unit 21c and is electrically connected to a connecting member 28. This connecting member 28 is electrically connected to a wiring pattern (not shown) provided in the inverter circuit board 24. The cold cathode fluorescent tube 20 is thus connected to the CCFL driving circuit T via the connecting member 25, conducting member 26 and connecting member 28. Also, the protruding unit 21c and connecting member 28 are covered by a connector cover member 27 formed by synthetic resin that is attached to the inverter circuit board 24.

Furthermore, a conductor 23 formed by metal foil, for example, is attached to an outer surface 21b1 of the extension unit 21b in the connecter 21. The conductor 23 electrically connects the chassis 12 and the ground wire G. Specifically, one end of the conductor 23 is electrically connected to the chassis 12, and the other end thereof is electrically connected to the ground wire G provided in the inverter circuit board 24. Also, the conductor 23 is configured to be electrically connected to the chassis 12 and the ground wire G when the connecter 21 is inserted into the attachment hole 12a of the chassis 12. That is, the conductor 23 electrically connects the chassis 12 and the ground wire G when the protruding unit 21c and the extension unit 21b of the connecter 21 are inserted into the attachment hole 12a of the chassis 12 so as to be attached to the chassis 12, and also the protruding unit 21c of the connecter 21 is inserted into the attachment hole 24a of the inverter circuit board 24 so as to be attached to the inverter circuit board 24. Accordingly, in the inverter circuit board 24, the CCFL driving circuit T is electrically connected to the chassis 12 via the ground wire G and the conductor 23, and set to the identical potential as the chassis 12, namely, grounded.

Figure 5:
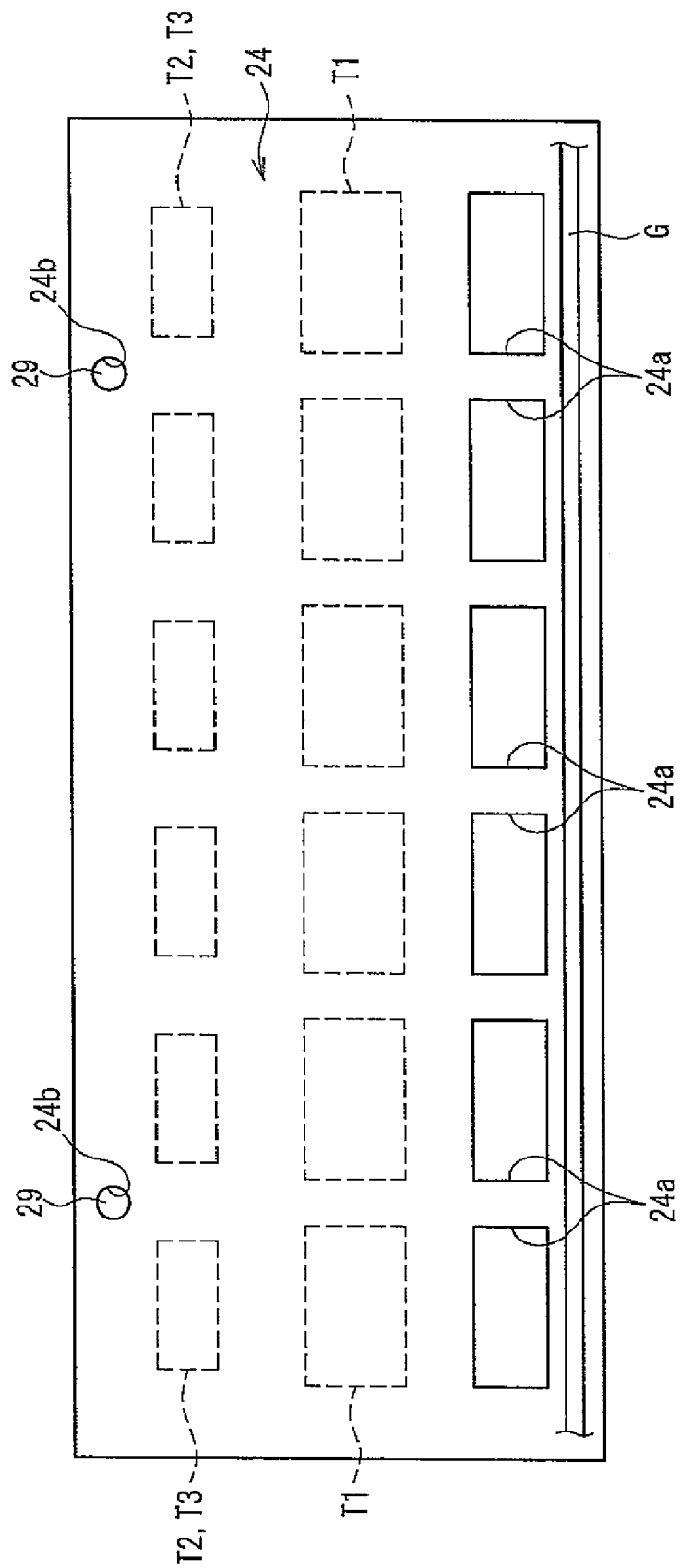
FIG. 5 is a plan view showing the inverter circuit board shown in FIG. 4(a).

Specifically, as shown in FIG. 5, in the inverter circuit board 24, the ground wire G is formed so as to run along the six attachment holes 24a on the surface arranged opposing the chassis 12. The ground wire G is connected to the transformer T1 and transistors T2 and T3 mounted on the surface (the rear face in FIG. 5) in the inverter circuit board 24 on the opposite side from the surface opposing the chassis 12. As a result of the ground wire G being electrically connected to the chassis 12 via the conductor 23 as described above, the CCFL driving circuit T is grounded.

Note that the inverter circuit board 24 includes screw holes 24b in two locations as shown in FIG. 5. The inverter circuit board 24 is fixed to the chassis 12 with screws 29 inserted into these screw holes 24b. In addition, the control IC included in the control unit 30 may be mounted on the inverter circuit board 24.

The illuminating device 3 according to the present embodiment configured as described above includes the connecter 21 for electrically connecting the cold cathode fluorescent tube (discharge tube) 20 and the CCFL driving circuit (inverter circuit) T. Also, in the illuminating device 3 according to the present embodiment, the connecter 21 is provided with the conductor 23 for electrically connecting the chassis 12 and the ground wire G provided in the inverter circuit board 24. In this manner, in the illuminating device 3 according to the present embodiment, unlike the above conventional examples, defective grounding of the inverter circuit can be reliably prevented even when the size of the inverter circuit board 24 is reduced, thereby preventing an adverse effect of noise from occurring in the CCFL driving circuit T.

Also in the illuminating device 3 according to the present embodiment, since the conductor 23 is electrically connected to the chassis 12 and the ground wire G provided in the inverter circuit board 24 when the connecter 21 is inserted into the attachment hole 12a of the chassis 12, it is possible to attach the connecter 21 to the chassis 12 and to ground the CCFL driving circuit T at the same time. As a result, with the illuminating device 3 according to the present embodiment, grounding (operation for grounding) of the CCFL driving circuit T can be performed more easily.

In the present embodiment, the illuminating device 3 used is capable of preventing occurrence of an adverse effect of noise in the CCFL driving circuit T even when the size of the inverter circuit board 24 is reduced. Thus it is possible to easily configure the liquid crystal display device 1 that is compact and reliable.

The above-described embodiments are to be construed in all respects as illustrative and not limiting. The scope of the present invention is indicated by the appended claims rather than by the foregoing description, and all changes which come within the meaning and range of equivalency of the configurations described in the claims are intended to be embraced therein.

For example, in the above description, a case is described in which the present invention is applied to the transmissive liquid crystal display device, but the illuminating device of the present invention is not limited thereto. The present invention can be also applied to various types of display devices that include a non-emissive display unit that displays information such as images and characters with the use of light from a light source. Specifically, the illuminating device of the present invention can be suitably applied to semi-transmissive liquid crystal display devices or projection-type display devices that use a liquid crystal panel as a light valve.

Also, other than the above description, the present invention can be suitably applied to a shaukasten that irradiates light onto radiographs, a light box that irradiates light onto photograph negatives or the like to facilitate viewing, or an illuminating device of a light-emitting device that illuminates signs, advertisement provided on station walls, or the like.

In the above description, a case is described in which the cold cathode fluorescent tube is used, but the discharge tube in the present invention is not limited thereto. Other discharge fluorescent tubes such as hot-cathode fluorescent tubes, xenon fluorescent tubes, or the like, or non-linear discharge fluorescent tubes such as U-shaped tubes or pseudo U-shaped tubes can be used as well.

Note that in the case where a mercury-free discharge fluorescent tube such as xenon fluorescent tube is used, an illuminating device having a long service life can be configured in which discharge tubes are aligned parallel to the direction of the force of gravity.

In the above description, a case is described in which by providing the inverter circuit at one end side of the cold cathode fluorescent tube, electric power is supplied to the cold cathode fluorescent tube from the one end side, that is, so-called one-side driving is performed, but the present invention is not limited thereto. The present invention can also be applied to the configuration in which the inverter circuit is provided to the other end side as well to cause the cold cathode fluorescent tube to undergo two-side driving.

In the above description, a case is described in which the conductor is provided on the outer surface of the connector, but the present invention is not limited thereto. The present invention is not limited as long as the present invention includes a connector for electrically connecting the discharge tube and the inverter circuit, and the connector is provided with a conductor for electrically connecting the chassis and the ground wire provided on the inverter circuit board. Specifically, a part of the conductor may be provided inside the connector.

Note that, however, the configuration in which the conductor is provided on the outer surface of the connector as in the above embodiment is preferable in that the structure of the connecter can be prevented from becoming complicated and also grounding (operation for grounding) of the inverter circuit can be easily performed by electrically connecting the chassis and the ground wire.

INDUSTRIAL APPLICABILITY

The present invention can be used for an illuminating device capable of preventing occurrence of an adverse effect of noise in the inverter circuit even when the size of the inverter circuit board is reduced, and a display device using the same.

The invention claimed is:
1. An illuminating device comprising:
a discharge tube;
an inverter circuit that is connected to the discharge tube and drives the discharge tube to be turned on;
a chassis made from metal that accommodates the discharge tube;
an inverter circuit board on which the inverter circuit is mounted and in which a ground wire is provided; and
a connector for electrically connecting the discharge tube and the inverter circuit,
wherein a conductor for electrically connecting the chassis and the ground wire is provided in the connector.
2. The illuminating device according to claim 1, wherein the conductor is attached to an outer surface of the connector.
3. The illuminating device according to claim 2,
wherein the inverter circuit board is attached to the chassis,
the chassis has an attachment hole for inserting the connector through and attaching the connector to the chassis, and
the conductor is electrically connected to the chassis and the ground wire provided in the inverter circuit board, when the connector is inserted into the attachment hole.
4. A display device using the illuminating device according to claim 1.

* * * * *